US011063806B2

United States Patent
Liu et al.

(10) Patent No.: US 11,063,806 B2
(45) Date of Patent: Jul. 13, 2021

(54) SYNCHRONIZATION METHOD AND APPARATUS (71) Applicant: HUAWEI TECHNOLOGIES CO., LTD., Shenzhen (CN)

(72) Inventors: Zhe Liu, Shanghai (CN); Hao Tang, Shanghai (CN); Wei Chen, Shanghai (CN); Liwen Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 52 days.

(21) Appl. No.: 16/577,379

(22) Filed: Sep. 20, 2019

(65) Prior Publication Data
US 2020/0014573 A1 Jan. 9, 2020

Related U.S. Application Data (63) Continuation of application No. PCT/CN2018/080330, filed on Mar. 23, 2018.

(30) Foreign Application Priority Data

Mar. 24, 2017 (CN) .......................... 201710184926.4

(51) Int. Cl.
*H04J 3/06* (2006.01)
*H04L 27/26* (2006.01)
*H04W 72/04* (2009.01)

(52) U.S. Cl.
CPC ....... *H04L 27/2657* (2013.01); *H04W 72/042* (2013.01); *H04W 72/0453* (2013.01)

(58) Field of Classification Search
CPC ............... H04L 27/2657; H04L 72/042; H04L 72/0453; H04W 72/042; H04W 72/0453
See application file for complete search history.

(56) References Cited

U.S. PATENT DOCUMENTS 7,587,017 B2 9/2009 Smith et al.
2015/0110083 A1 4/2015 Takano
(Continued)

FOREIGN PATENT DOCUMENTS

CN 101610110 A 12/2009
CN 101719786 A 6/2010
(Continued)

OTHER PUBLICATIONS

Huawei, "Considerations of NR UL operation on the uplink band of LTE",3GPP TSG RAN WG1 NR Ad-Hoc Meeting, R1-1700032,Spokane, USA, Jan. 16-20, 2017, total 6 pages.

*Primary Examiner* — Erika A Washington
(74) *Attorney, Agent, or Firm* — Stein IP, LLC (57) ABSTRACT

A synchronization method including: receiving, by a terminal, a system message on a first downlink carrier, where the system message includes first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and receiving, by the terminal, a synchronization signal on the second downlink carrier, to implement frequency synchronization with the first uplink carrier. According to the synchronization method in NR-LTE co-existence, a terminal can implement frequency synchronization with an LTE uplink carrier, so that the terminal can perform uplink transmission by using a frequency domain resource in the LTE uplink carrier.

20 Claims, 7 Drawing Sheets

(56) References Cited

U.S. PATENT DOCUMENTS

| | | | |
|---|---|---|---|
| 2015/0296453 A1 | 10/2015 | Hiremath et al. | |
| 2015/0349931 A1* | 12/2015 | Damnjanovic | H04W 56/001 370/280 |
| 2016/0205692 A1* | 7/2016 | Zhang | H04W 48/12 370/329 |

FOREIGN PATENT DOCUMENTS

| | | |
|---|---|---|
| CN | 101998614 A | 3/2011 |
| CN | 102238720 A | 11/2011 |
| CN | 102349275 A | 2/2012 |
| CN | 102892192 A | 1/2013 |
| CN | 103517399 A | 1/2014 |
| CN | 103582111 A | 2/2014 |
| CN | 105340196 A | 2/2016 |
| CN | 106464401 A | 2/2017 |

* cited by examiner

SYNCHRONIZATION METHOD AND APPARATUS

CROSS-REFERENCE TO RELATED APPLICATIONS

This application is a continuation of International Application No. PCT/CN2018/080330, filed on Mar. 23, 2018, which claims priority to Chinese Patent Application No. 201710184926.4, filed on Mar. 24, 2017, the disclosures of the aforementioned applications are hereby incorporated by reference in their entireties.

TECHNICAL FIELD

Aspects of the present application relates to the field of communications technologies, and in particular, to a synchronization method and an apparatus.

BACKGROUND

In a wireless communications system, a terminal and a network transmit data to each other based on a radio communications technology. However, before transmitting data, the terminal usually needs to access the network to establish a connection to the network.

Generally, the connection between the terminal and the network may be recorded as a link for short. Two endpoints of a link are respectively used to represent two devices that receive and send data. One endpoint represents a device that uses a network service, for example, a terminal. The other endpoint represents a device that provides the network service, for example, a base station. A connection line between the two endpoints is used to represent a data transmission path. The link is classified into an uplink (UL) and a downlink (DL) based on a data transmission direction.

To transmit data to each other, both the uplink and the downlink between the terminal and the network are necessary. In addition, to ensure effectiveness and reliability of data transmission, the uplink and the downlink need to cooperate with each other. Data retransmission is used as an example. A terminal receives data in a downlink. If it is detected that data transmission fails, the terminal needs to feed back, in an uplink cooperated with the downlink, that a transmission status of the data is a failure, to trigger a base station to retransmit the data. Correspondingly, after sending the data in the downlink, the base station also needs to monitor feedback from the terminal in the uplink cooperated with the downlink. The cooperation between the uplink and the downlink is usually long-term and fixed, and is also referred to as paired or coupled. In this case, the connection between the terminal and the network may be understood as an uplink and a downlink that are paired.

To properly and efficiently utilize frequency resources, the international telecommunication union (ITU) sets radio regulations. The regulations provide strict regulations for allocation of radio frequency bands and assignment and use of a frequency channel. Therefore, a commercial wireless communications system is usually allowed to operate within only a radio frequency range specified by the ITU. A mobile communications system is used as an example. An authorized frequency range of the mobile communications system is referred to as a licensed spectrum of the mobile communications system. Different mobile communications systems usually have different licensed spectrums.

Currently, an operating band of 4G LTE is specified in technical specifications of the 3rd generation partnership project (3GPP). Technical specifications of a 5th generation (5G) mobile communications system are being studied and formulated. Compared with those of 4G, a transmission solution and an operating band of 5G need to be redesigned. Therefore, a 5G radio technology is referred to as a 5G new radio (NR) in 3GPP research projects, and sometimes is also referred to as a 5G new air interface. For example, in the 4G LTE, an operating band 1 includes an uplink operating band 1920 MHz to 1980 MHz and a downlink operating band 2110 MHz to 2170 MHz that are paired. To meet requirements of a higher peak rate and a higher system capacity, an operating band in the 5G NR is expected to be much higher than that in the 4G LTE. At the current stage, a candidate licensed spectrum of the 5G NR includes a high frequency band from 24.25 GHz to 86 GHz.

However, signal attenuation on the high frequency band is relatively serious. If the 5G NR supports operating only on the high frequency band, network coverage may be a problem. In addition, considering scarcity of frequency resources, the 5G NR should also support an operation on a licensed spectrum in the 4G LTE. In other words, the 5G NR and the 4G LTE may share the licensed spectrum of the 4G LTE. This is referred to as NR-LTE co-existence in the 3GPP research project. That the 5G NR uses the licensed spectrum of the 4G LTE not only enhances a coverage capability of a 5G network, but also improves resource utilization of the 4G licensed spectrum. In addition, because some operators may have only 4G licensed spectrums, the NR-LTE co-existence is of great significance for early commercial use of the 5G network. However, the NR-LTE co-existence is now still a research framework, and a specific technical solution still needs to be further explored and researched.

SUMMARY

This application provides a synchronization method and an apparatus to resolve a technical problem of how a terminal implements frequency synchronization with an LTE uplink carrier in NR-LTE co-existence.

According to a first aspect, this application provides a synchronization method, including:

receiving, by a terminal, a system message on a first downlink carrier, where the system message includes first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and receiving, by the terminal, a synchronization signal on the second downlink carrier, to implement frequency synchronization with the first uplink carrier.

In this way, the terminal receives the synchronization signal on the second downlink carrier based on the second downlink carrier indicated in the system message, to implement frequency synchronization with the second downlink carrier. Because the frequency of the second downlink carrier is presynchronized with the frequency of the first uplink carrier, frequency synchronization between the terminal and the first uplink carrier is implemented. In other words, according to the synchronization method in this application, in NR-LTE co-existence, a terminal can implement frequency synchronization with an LTE uplink carrier, so that the terminal can perform uplink transmission by using a frequency domain resource in the LTE uplink carrier, thereby enhancing a coverage capability of an NR network and improving resource utilization of an LTE licensed spectrum.

In the foregoing process, the terminal implements frequency domain synchronization with the first uplink carrier. To complete uplink synchronization, the terminal further needs to implement time synchronization with the first uplink carrier. Therefore, this application may further include:

receiving, by the terminal, a timing advance command on the first downlink carrier, and implementing time synchronization with the first uplink carrier based on the timing advance command, where the timing advance command is obtained by the network device based on a transmission time difference between the first downlink carrier and a third downlink carrier and a propagate latency between the network device and the terminal; or when the system message includes the transmission time difference between the first downlink carrier and the third downlink carrier, implementing, by the terminal, time domain synchronization with the first uplink carrier based on the transmission time difference between the first downlink carrier and the third downlink carrier and the propagate latency between the network device and the terminal.

The second downlink carrier is located in an operating band of the third downlink carrier, and the third downlink carrier is a downlink carrier paired with the first uplink carrier.

According to a second aspect, this application provides a synchronization method, including:

sending, by a network device, a system message on a first downlink carrier, where the system message includes first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and sending, by the network device, a synchronization signal on the second downlink carrier.

According to a third aspect, this application provides a terminal, including a processor and a transceiver, and the processor performs the following operations with the transceiver:

receiving a system message on a first downlink carrier, where the system message includes first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and receiving a synchronization signal on the second downlink carrier, to implement frequency synchronization with the first uplink carrier.

According to a fourth aspect, this application provides a network device, including a processor and a transceiver, and the processor performs the following operations with the transceiver:

sending a system message on a first downlink carrier, where the system message includes first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and sending a synchronization signal on the second downlink carrier.

With reference to any one of the first aspect to the fourth aspect, in a first implementation of any aspect, that a frequency of the first uplink carrier is presynchronized with a frequency of the second downlink carrier includes:

a frequency domain spacing between the first uplink carrier and the second downlink carrier is less than a predefined value.

With reference to any one of the first aspect to the fourth aspect, in a second implementation of any aspect, that a frequency of the first uplink carrier is presynchronized with a frequency of the second downlink carrier includes:

the second downlink carrier is located in the operating band of the third downlink carrier, and the third downlink carrier is the downlink carrier paired with the first uplink carrier.

With reference to any one of the first aspect to the fourth aspect and the second implementation of any aspect, in a third implementation of any aspect, the second downlink carrier is located in guard bandwidth of the third downlink carrier, where the guard bandwidth of the third downlink carrier may be an unoccupied frequency domain resource reserved at an edge of the third downlink carrier.

With reference to any one of the first aspect to the fourth aspect and the second implementation of any aspect, in a fourth implementation of any aspect, the second downlink carrier is located in transmission bandwidth of the third downlink carrier, where the transmission bandwidth of the third downlink carrier is a frequency domain resource, of the third downlink carrier, that is used to transmit a signal.

With reference to any one of the first aspect to the fourth aspect and the fourth implementation of any aspect, in a fifth implementation of any aspect, the second downlink carrier is located on an unoccupied frequency domain resource in a non-MBSFN subframe of the third downlink carrier, or is located on an unoccupied frequency domain resource in an MBSFN subframe of the third downlink carrier.

In any one of the first aspect to the fourth aspect and any implementation of any aspect, the first uplink carrier is a licensed spectrum of a long term evolution LTE system.

In any one of the first aspect to the fourth aspect and any implementation of any aspect, the terminal operates on the first uplink carrier by using a radio access technology of a non-LTE system.

This application further provides a communications system. The communications system includes the terminal provided in any one of the foregoing designs, and may further include the network device that interacts with the terminal in solutions provided in this application.

This application further provides a computer storage medium, where the storage medium stores a software program, and when the software program is read and executed by one or more processors, the synchronization method provided in any one of the foregoing designs may be implemented.

This application further provides a computer program product including an instruction. When the computer program product runs on a computer, the computer performs the synchronization methods in the foregoing aspects or possible implementations.

This application further provides a computer program. When the computer program runs on a computer, the computer performs the synchronization methods in the foregoing aspects or possible implementations.

DESCRIPTION OF EMBODIMENTS

The following specifically describes aspects of this application with reference to the accompanying drawings in the specification.

Figure 1:
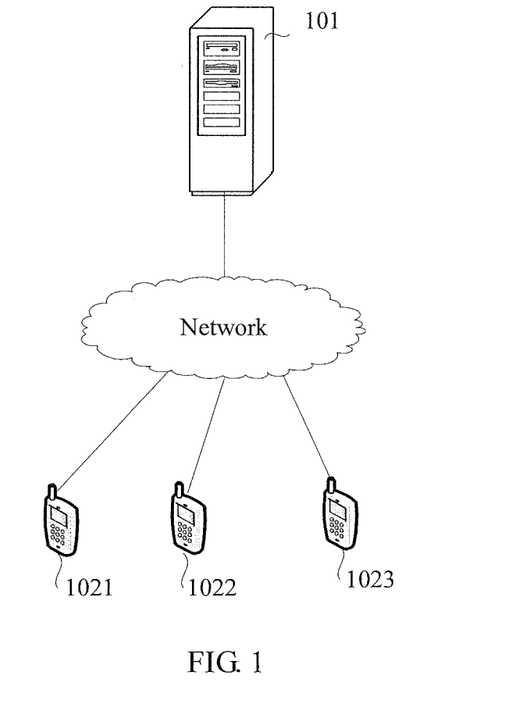
FIG. 1 is a schematic diagram of a first system architecture applicable to this application.

FIG. 1 is a schematic diagram of a system architecture applicable to aspects of this application. As shown in FIG. 1, the system architecture includes a network device 101 and one or more terminals, such as a terminal 1021, a terminal 1022, and a terminal 1023 shown in FIG. 1. The network device 101 may transmit downlink data to the terminal 1021, the terminal 1022, and the terminal 1023 by using a network. The terminal 1021, the terminal 1022, and the terminal 1023 may transmit uplink data to the network device 101 by using a network.

In this application, the network device may be a base station (BS) device. The base station device may also be referred to as a base station, and is an apparatus that is deployed in a radio access network to provide a wireless communication function. For example, a device that provides a base station function in a 2G network includes a base wireless transceiver station (BTS) and a base station controller (BSC). A device that provides a base station function in a 3G network includes a NodeB and a radio network controller (RNC). A device that provides a base station function in a 4G network includes an evolved NodeB (eNB). A device that provides a base station function in a 5G network includes a new radio NodeB (gNB), a centralized unit (CU), a distributed unit, and a new radio controller.

The terminals 1021-1023 may each be a device providing voice and/or data connectivity for a user, and may include a wired terminal and a wireless terminal. The wireless terminal may be a handheld device with a wireless connection function, or another processing device connected to a wireless modem, and may be a mobile terminal that communicates with one or more core networks by using a radio access network. For example, the wireless terminal may be a mobile phone, a computer, a tablet computer, a personal digital assistant (PDA), a mobile Internet device (MID), a wearable device, or an e-book reader. For another example, the wireless terminal may also be a portable, pocket-sized, handheld, computer built-in, or vehicle-mounted mobile device. For still another example, the wireless terminal may be a part of a mobile station, an access point, or user equipment (UE).

In this application, the system architecture shown in FIG. 1 is mainly used as an example for description, but this application is not limited thereto. For example, this application may further be applicable to a system architecture in which a macro base station communicates with a micro base station. This is not specifically limited.

A communications system applicable to the foregoing system architecture includes but is not limited to: code division multiple access (CDMA) IS-95, code division multiple access (CDMA) 2000, time division-synchronous code division multiple access (TD-SCDMA), wideband code division multiple access (WCDMA), time division duplex-long term evolution (TDD LTE), frequency division duplex-long term evolution (FDD LTE), long term evolution-advanced (LTE-advanced), and various future evolved wireless communications systems (for example, a 5G NR system).

The 5G NR system is used as an example. Currently, an NR candidate licensed spectrum includes a high frequency band from 24.25 GHz to 86 GHz, which is much higher than an operating band in LTE. To enhance a coverage capability of an NR network and improve resource utilization of an LTE licensed spectrum, the NR and the LTE share an LTE licensed spectrum.

Figure 2:
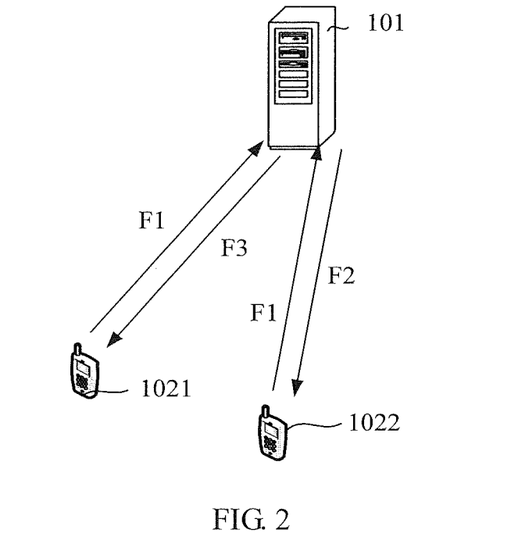
FIG. 2 is a schematic diagram of a possible scenario according to this application.

In a possible scenario, as shown in FIG. 2, an uplink carrier F1 and a downlink carrier F3 are LTE licensed spectrums, a downlink carrier F2 is an NR licensed spectrum, and uplink transmission of the terminal 1022 and uplink transmission of the terminal 1021 share the uplink carrier F1, in other words, the terminal 1022 transmits NR uplink data by using a time-frequency resource on the uplink carrier F1. Before transmitting the NR uplink data by using the time-frequency resource on the uplink carrier F1, the terminal 1022 needs to implement frequency synchronization with the uplink carrier F1. Otherwise, the uplink transmission of the terminal 1022 on the uplink carrier F1 and the uplink transmission of the terminal 1021 on the uplink carrier F1 are not orthogonal in frequency domain, and consequently, interference and a performance loss are caused. The LTE downlink carrier F3 and the LTE uplink carrier F1 are frequency resources occupied by an uplink link and a downlink link that are paired. If a frequency of the NR downlink carrier F2 is presynchronized with a frequency of the LTE uplink carrier F1, the terminal 1022 may directly implement frequency synchronization with the NR downlink carrier F2 by searching for a synchronization signal on the NR downlink carrier F2, so as to implement frequency synchronization with the LTE uplink carrier F1. Frequency presynchronization between the NR downlink carrier F2 and the LTE uplink carrier F1 may be that a frequency domain spacing between the NR downlink carrier and the LTE uplink carrier is less than a predefined value. The predefined value may be hundreds MHz or even several GHz, and may be specifically set, based on experience and an actual situation, by a person skilled in the art. For example, the predefined value may be 450 M or 2 G, and the terminal 1022 may implement frequency domain synchronization with the LTE uplink carrier F1 based on the synchronization signal on the NR downlink carrier F2. The synchronization signal that is used by the terminal 1022 to implement frequency domain synchronization with the LTE uplink carrier F1 is transmitted on the NR downlink carrier F2.

However, if the frequency of the NR downlink carrier is not presynchronized with the frequency of the LTE uplink carrier, the terminal 1022 cannot implement frequency synchronization with the LTE uplink carrier F1.

Based on this, an aspect of this application provides a synchronization method, to resolve a technical problem of how a terminal implements frequency synchronization with an LTE uplink carrier in NR-LTE co-existence.

Specifically, to resolve a technical problem that a terminal cannot implement frequency synchronization with the LTE uplink carrier, a special downlink carrier may be introduced in this application, and a frequency of the special downlink carrier is presynchronized with a frequency of the LTE uplink carrier. The special downlink carrier is used to transmit a synchronization signal. After receiving the synchronization signal by using the special downlink carrier, the terminal may implement frequency presynchronization with the special downlink carrier, so as to implement frequency synchronization with the LTE uplink carrier.

Figure 3:
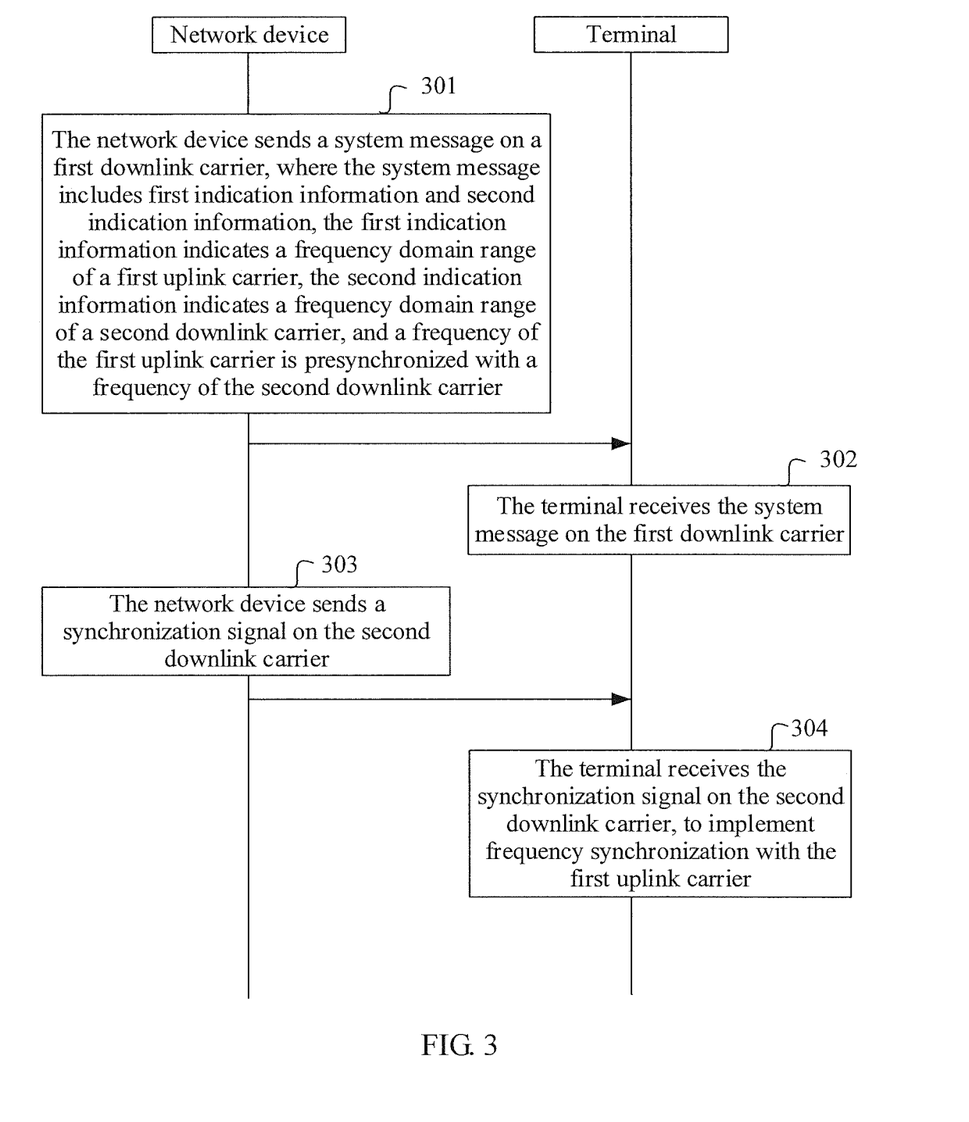
FIG. 3 is a schematic flowchart corresponding to an uplink synchronization method according to an aspect of this application.

Based on the foregoing system architecture, FIG. 3 is a schematic flowchart corresponding to a synchronization method according to this application. As shown in FIG. 3, the method includes:

Step 301: A network device sends a system message on a first downlink carrier, where the system message includes first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier.

Step 302: A terminal receives the system message on the first downlink carrier.

Step 303: The network device sends a synchronization signal on the second downlink carrier.

Step 304: The terminal receives the synchronization signal on the second downlink carrier, to implement frequency synchronization with the first uplink carrier.

In this way, the terminal receives the synchronization signal on the second downlink carrier based on the second downlink carrier indicated in the system message, to implement frequency synchronization with the second downlink carrier. Because the frequency of the second downlink carrier is presynchronized with the frequency of the first uplink carrier, frequency synchronization between the terminal and the first uplink carrier is implemented.

Specifically, before step 302, the terminal performs a cell search, and receives, on the first downlink carrier, a first synchronization signal sent by the network device, to implement frequency and time synchronization with the first downlink carrier. In step 302, the terminal receives and decodes the system message sent by the network device. The first indication information in the system message indicates the frequency domain range of the first uplink carrier, and the second indication information indicates the frequency domain range of the second downlink carrier. In this application, the network device and the terminal may store a correspondence that is between a frequency and an identifier and that is agreed on in advance. The first indication information may include an identifier corresponding to a center frequency of the first uplink carrier. The second indication information may include an identifier corresponding to a center frequency of the second downlink carrier. After receiving the first indication information, the terminal may obtain the center frequency of the first uplink carrier based on the identifier included in the first indication information. Similarly, the terminal obtains the center frequency of the second downlink carrier. Optionally, the first indication information may further include channel bandwidth of the first uplink carrier, and the second indication information may further include channel bandwidth of the second downlink carrier. This is not specifically limited.

In step 303 and step 304, the network device sends the synchronization signal on the second downlink carrier. After receiving the synchronization signal on the second downlink carrier, the terminal implements frequency domain synchronization with the second downlink carrier. Because the frequency of the second downlink carrier is presynchronized with the frequency of the first uplink carrier, the terminal may further implement frequency synchronization with the first uplink carrier. Then, the terminal may perform uplink transmission of the first downlink carrier on the first uplink carrier.

In an aspect of this application, the first uplink carrier is a licensed spectrum of an LTE system, and the first uplink carrier may support a radio access technology of a non-LTE system, for example, an NR system.

The scenario shown in FIG. 2 is used as an example. The first downlink carrier is the NR downlink carrier F2, and for the NR downlink carrier F2, the first uplink carrier is an NR shared uplink carrier F1. The second downlink carrier F3 is a special downlink carrier introduced in this application to transmit a synchronization signal. To enable the terminal 1021, for example, to receive the synchronization signal on the second downlink carrier to implement frequency synchronization with the first uplink carrier, in this application, a frequency domain spacing between the second downlink carrier and the first uplink carrier is less than a predefined threshold. The predefined value may be 450 M or 2 G. For example, in an LTE band 10, for a 10 M downlink carrier whose center frequency is 2156 M and a 10 M uplink carrier whose center frequency is 1715 M, after the terminal 1021, for example, obtains, through searching, a synchronization signal on the downlink carrier whose center frequency is 2156 M in LTE, and implements frequency domain synchronization with the downlink carrier whose center frequency is 215 M, a network may determine that the terminal implements frequency domain synchronization with the uplink carrier whose center frequency is 1715 M, and a frequency domain spacing between the downlink carrier whose center frequency is 2156 M and the uplink carrier whose center frequency is 1715 M is 450 M. For a 3.5 G downlink carrier, after the terminal obtains a synchronization signal on the 3.5 G downlink carrier through searching, the network may determine that the terminal implements frequency synchronization with an uplink carrier whose center frequency is 900 M. In addition, in an LTE FDD system, for an FDD downlink carrier and an FDD uplink carrier that are paired, the terminal receives a synchronization signal on the downlink carrier, and after the terminal implements frequency synchronization with the downlink carrier, it may be considered that the terminal also implements frequency synchronization with the uplink carrier paired with the downlink carrier. For paired LTE FDD carriers, an FDD uplink carrier and an FDD downlink carrier belong to a same operating band. One operating band includes one uplink operating band and one downlink operating band. The downlink operating band and the uplink operating band are paired. The scenario shown in FIG. 2 is used as an example. A third downlink carrier is the LTE downlink carrier F3. For the LTE downlink carrier F3, the first uplink carrier is an LTE shared uplink carrier F1. The LTE shared uplink carrier F1 and the LTE downlink carrier F3 are paired, and the LTE terminal may implement frequency synchronization with the LTE shared uplink carrier F1 based on a synchronization signal on the LTE downlink carrier F3.

Therefore, in an aspect of this application, the second downlink carrier indicated in the system information on the first downlink carrier may be in an operating band of the third downlink carrier that is paired with the first uplink carrier. In this way, an NR terminal may implement frequency synchronization with the first uplink carrier by obtaining a synchronization signal on the second downlink carrier, so that the NR terminal uses a time-frequency resource that is not occupied by uplink transmission of the third downlink carrier and that is on the first uplink carrier, to further improve resource utilization of the first uplink carrier.

To avoid impact of the synchronization signal on the second downlink carrier on normal downlink transmission of the third downlink carrier, the second downlink carrier may be located on a frequency domain resource that is on the third downlink carrier and that is not occupied by LTE transmission. In a first possible case, the second downlink carrier is located in guard bandwidth of the third downlink carrier. In a second possible case, the synchronization signal of the second downlink carrier is located on an unoccupied frequency domain resource that is allocated for multicast-broadcast single-frequency network (MBSFN) transmission and that is in the third downlink carrier. In a third possible case, the second downlink carrier is located on an unoccupied frequency domain resource in a non-MBSFN subframe of the third downlink carrier.

The following separately describes the foregoing possible cases in detail.

The first possible case is as follows.

Figure 4:
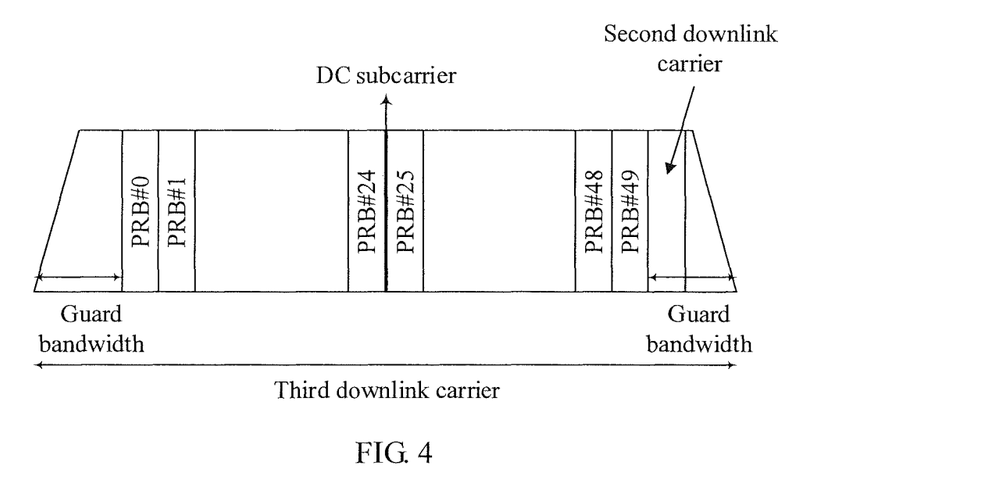
FIG. 4 is an example diagram in which a second downlink carrier is located in guard bandwidth of a third downlink carrier.

To avoid interference to a neighboring cell, a guard bandwidth is usually reserved at an edge of a downlink carrier. Therefore, in an aspect of this application, the second downlink carrier may be located in the guard bandwidth of the third downlink carrier. In other words, a frequency domain resource of the guard bandwidth of the third downlink carrier is used to transmit a synchronization signal. FIG. 4 is an example diagram in which a second downlink carrier is located in guard bandwidth of a third downlink carrier. As shown in FIG. 4, a plurality of physical resource blocks (PRB) are carried on the third downlink carrier, for example, a PRB #0 to a PRB #49. Guard bandwidth is reserved at an edge of the third downlink carrier, and the second downlink carrier is located in guard bandwidth adjacent to the PRB #49.

The second downlink carrier may also be located in the guard bandwidth adjacent to the PRB #0, or located in another area of the guard bandwidth. This is not specifically limited. The second downlink carrier is used to transmit a synchronization signal, and is not required to transmit data. Therefore, to avoid occupying excessive resources, a frequency domain range of the second downlink carrier may be relatively narrow. For example, bandwidth of the second downlink carrier may be a frequency domain width of one PRB. In this case, the synchronization signal transmitted on the second downlink carrier is a narrowband synchronization signal.

Figure 5:
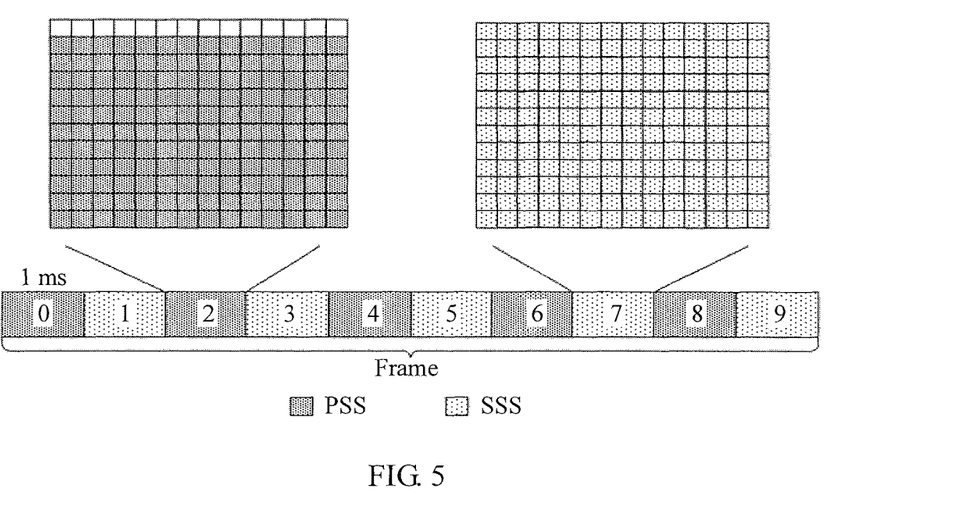
FIG. 5 is an example diagram in which a narrowband synchronization signal is transmitted on a second downlink carrier.

Specifically, FIG. 5 is an example diagram in which a narrowband synchronization signal is transmitted on a second downlink carrier. As shown in FIG. 5, the narrowband synchronization signal may include a primary synchronization signal (PSS) and a secondary synchronization signal (SSS). The PSS may be generated based on a ZC sequence with a length of 11 and a root of 5. In even-numbered subframes, namely, subframe 0, a subframe 2, a subframe 4, a subframe 6, and a subframe 8, the PSS is only mapped to the first RE to the eleventh RE, and a signal on the twelfth RE is set to 0. In addition, the PSS signal is repeated for 14 times in time domain. The secondary synchronization signal may be generated based on a ZC sequence with a length of 167, and the SSS is mapped to the first RE to the 168th RE. In addition, the SSS signal may be mapped to a PRB according to a rule of frequency domain first and time domain next.

A second possible case is as follows.

When the third downlink carrier supports MBSFN transmission, a frequency domain resource allocated for MBSFN transmission is configured in the third downlink carrier. Therefore, in this application, the synchronization signal transmitted on the second downlink carrier may be located on an unoccupied frequency domain resource in an MBSFN subframe of the third downlink carrier.

Figure 6:
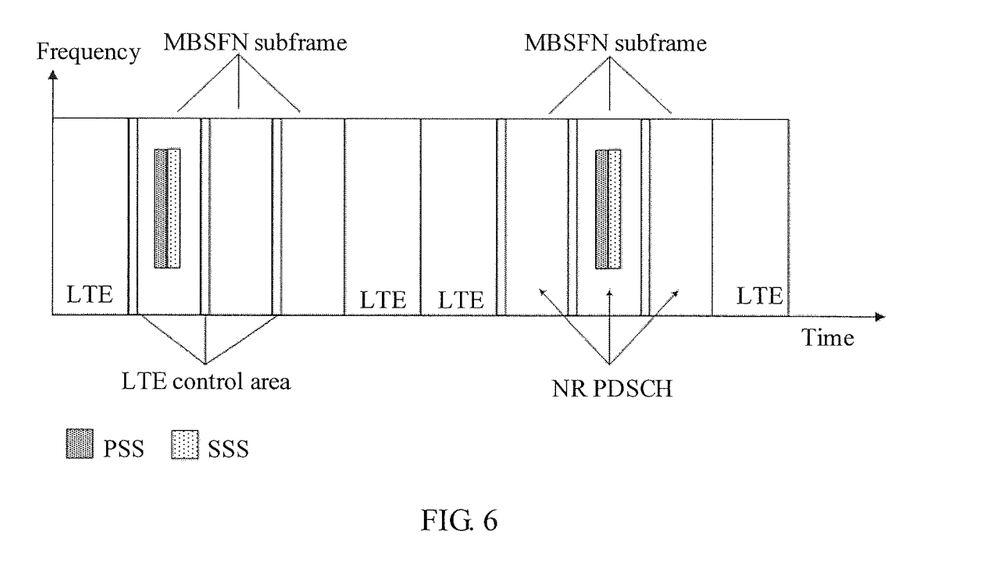
FIG. 6 is an example diagram in which a second downlink carrier is located on a frequency domain resource that is allocated for MBSFN transmission and that is in a third downlink carrier.

FIG. 6 is an example diagram in which a second downlink carrier is located on a frequency domain resource in an MBSFN subframe of a third downlink carrier. As shown in FIG. 6, an NR physical downlink shared channel (PDSCH) may be transmitted on the second downlink carrier, and both a synchronization signal and an NR PDSCH that are transmitted on the second downlink carrier are located in the MBSFN subframe of the third downlink carrier.

In this case, the synchronization signal transmitted on the second downlink carrier is a broadband SS signal. A generation manner of the synchronization signal transmitted on the second downlink carrier may be the same as a generation manner of a synchronization signal transmitted on the first downlink carrier. A specific generation manner is not limited.

The third possible case is as follows.

Figure 7:
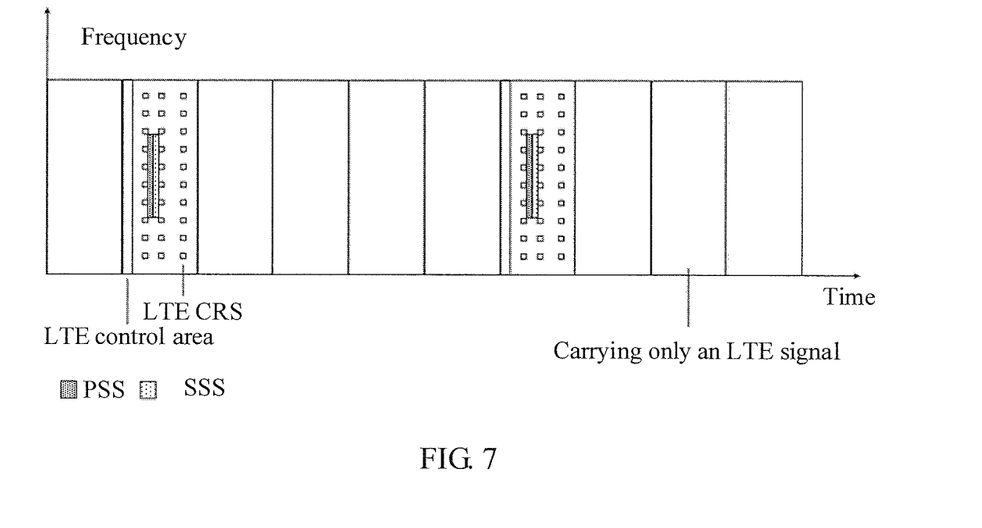
FIG. 7 is an example diagram in which a second downlink carrier is located on an unoccupied frequency domain resource in a normal subframe of a third downlink carrier.

Because there is a frequency domain resource that is not occupied by LTE transmission in the non-MBSFN subframe of the third downlink carrier, in this application, the second downlink carrier may be located on the frequency domain resource that is not occupied by the LTE transmission in the non-MBSFN subframe of the third downlink carrier. In other words, the frequency domain resource that is not occupied by the LTE transmission in the non-MBSFN subframe of the third downlink carrier is used to transmit a synchronization signal. FIG. 7 is an example diagram in which a second downlink carrier is located on a frequency domain resource that is not occupied by LTE transmission in a non-MBSFN subframe of a third downlink carrier. As shown in FIG. 7, a time-frequency location for transmitting a synchronization signal bypasses an LTE cell-specific reference signal (CRS), an LTE control area, and an LTE periodic signal that are in an LTE FDD downlink subframe.

In this case, the synchronization signal transmitted on the second downlink carrier is a broadband synchronization signal. A generation manner of the synchronization signal transmitted on the second downlink carrier may be the same as a generation manner of a synchronization signal transmitted on the first downlink carrier. A specific generation manner is not limited.

It should be noted that the foregoing three possible cases are merely examples. In another aspect of this application, the second downlink carrier may also be another frequency domain resource. This is not specifically limited.

The terminal implements frequency domain synchronization with the first uplink carrier in the foregoing process. To complete uplink synchronization, the terminal further needs to implement time synchronization with the first uplink carrier. For the LTE FDD system, different base stations have different time sequences. For the NR system, different base stations synchronize with each other. Therefore, in NR-LTE co-existence, there is a time difference between an LTE DL time sequence and an NR DL time sequence. If a prior-art method in which downlink timing of a first carrier is used as a reference is used, and a timing advance (TA) is set as two times of a propagation latency from a terminal to a base station, a terminal that camps on an NR downlink carrier does not synchronize with an LTE uplink carrier. In other words, uplink transmission of the terminal that camps on the NR downlink carrier conflicts with uplink transmission of a terminal that camps on an LTE downlink carrier. In other words, uplink transmission of the terminal 1021 shown in FIG. 2 conflicts with uplink transmission of the terminal 1022 shown in FIG. 2. Consequently, time domain orthogonality cannot be ensured.

The time difference between the LTE DL time sequence and the NR DL time sequence, namely, a transmission time difference between the first downlink carrier and the third downlink carrier, may be represented by using a time offset time_offset of a first downlink carrier reference subframe relative to a third downlink carrier reference subframe. If the first downlink carrier reference subframe falls behind the third downlink carrier reference subframe, a value of the time offset time_offset is positive. If the first downlink carrier reference subframe is previous to the third downlink carrier reference subframe, a value of the time offset time_offset is negative.

Figure 8:
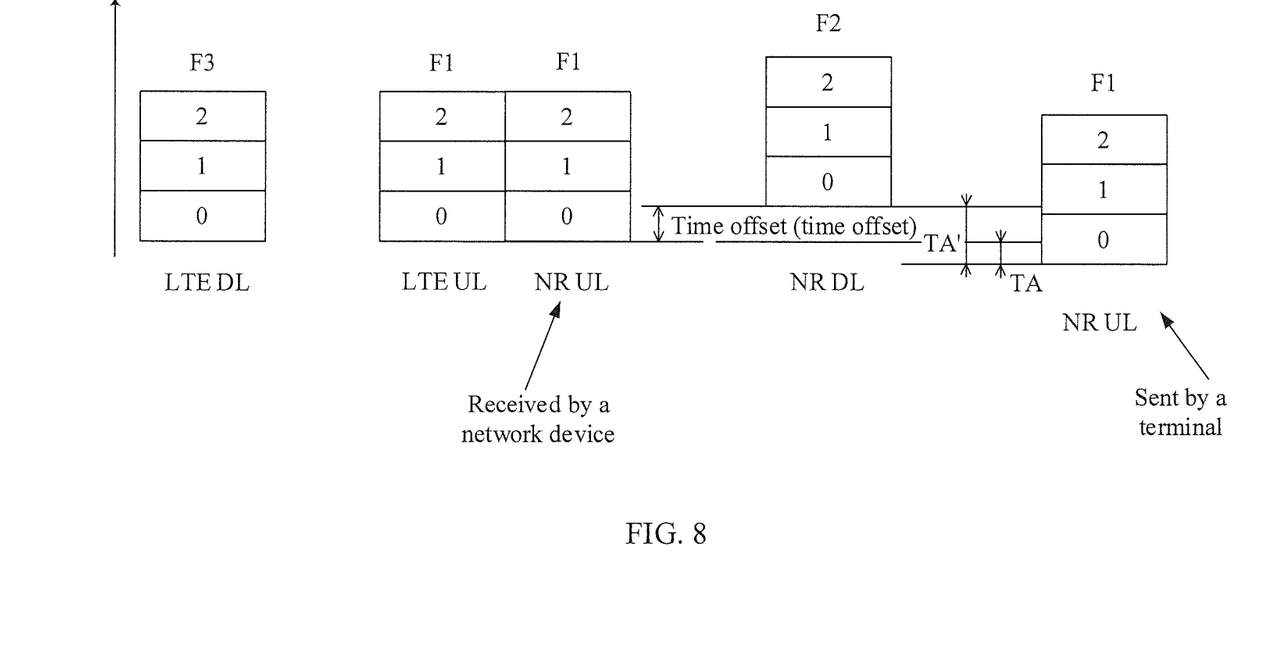
FIG. 8 is a schematic diagram of a time offset of a first downlink carrier reference subframe relative to a third downlink carrier reference subframe.

FIG. 8 is a schematic diagram of a time offset of a first downlink carrier reference subframe relative to a third downlink carrier reference subframe. As shown in FIG. 8, an NR downlink carrier F2 is a first downlink carrier, an LTE downlink carrier F3 is a third downlink carrier, an uplink carrier F1 is a first uplink carrier, and a first downlink carrier reference subframe 0 falls behind a third downlink carrier reference subframe 0. In this case, a value of time_offset is positive. To ensure time domain orthogonality between uplink transmission of a terminal that camps on the first downlink carrier and uplink transmission of a terminal that camps on the third downlink carrier, an actual timing advance of uplink transmission of the terminal that camps on the first downlink carrier may be set to TA'=TA+time_offset.

The time offset time_offset of the first downlink carrier reference subframe relative to the third downlink carrier reference subframe may be determined by a network device (namely, a base station) based on downlink time information of the first downlink carrier and downlink time information of the third downlink carrier.

To ensure that uplink transmission of the first downlink carrier and uplink transmission of the third downlink carrier reach the network device at a same moment, in a possible implementation, the network device sets, based on timing of the third downlink carrier, a timing advance TA' of the terminal that accesses the first downlink carrier. Specifically, the network device may send a random access response (RAR) message on the first downlink carrier, where a timing advance command of the RAR includes the TA'. In this case, a value of the TA' is equal to a sum of a value of two times of a propagation latency from the terminal to the base station and the time offset time offset of the first downlink carrier relative to the third downlink carrier. In this way, after receiving the TA' in a broadcast message, the terminal may perform uplink transmission based on the TA', thereby effectively ensuring the time domain orthogonality between the uplink transmission of the terminal that camps on the third downlink carrier and the uplink transmission of the terminal that camps on the first downlink carrier. In this implementation, the network device calculates the actual timing advance. Because the network device has a relatively strong processing capability, accuracy of the actual timing advance obtained through calculation can be effectively ensured, and no effect is imposed on a protocol.

In another possible implementation, the network device sends a system message on the first downlink carrier, where the system message carries a time offset time_offset, and the network device sets, based on timing of the first downlink carrier, a timing advance TA of the terminal that accesses the first downlink carrier. Specifically, the network device may send a RAR message on the first downlink carrier, where a timing advance command of the RAR includes the TA. In this case, a value of the TA is equal to two times of a propagation latency from the terminal to the base station. After receiving the time offset time_offset in the system message, the terminal may obtain an actual timing advance TA' through calculation with reference to the received TA in the timing advance command sent by the network device, and perform uplink transmission based on the TA'. In this implementation, the terminal calculates the actual timing advance, to effectively reduce processing burden of the network device.

When the network device enables transmission, on the first uplink carrier, of the terminal that camps on the first downlink carrier and transmission, on the first uplink carrier, of the terminal that camps on the third downlink carrier to reach the network device at the same time, the network device needs to consider a time difference between the first downlink carrier and the third downlink carrier when setting the first downlink carrier. A specific calculation manner is not limited to the foregoing example.

The terminal receives a synchronization signal on a second downlink carrier based on the second downlink carrier indicated in the system message, to implement frequency synchronization with the second downlink carrier. Because a frequency of the second downlink carrier is presynchronized with a frequency of the first uplink carrier, the terminal implements frequency synchronization with the first uplink carrier. In other words, according to the synchronization method in this application, in NR-LTE co-existence, the terminal can implement frequency synchronization with an LTE uplink carrier, so that the terminal can perform uplink transmission by using a frequency domain resource in the LTE uplink carrier, thereby enhancing a coverage capability of an NR network and improving resource utilization of an LTE licensed spectrum.

For the foregoing method procedure, according to an aspect of this application further provides a terminal and a network device. For specific implementation of the terminal and the network device, refer to the foregoing method.

Figure 9:
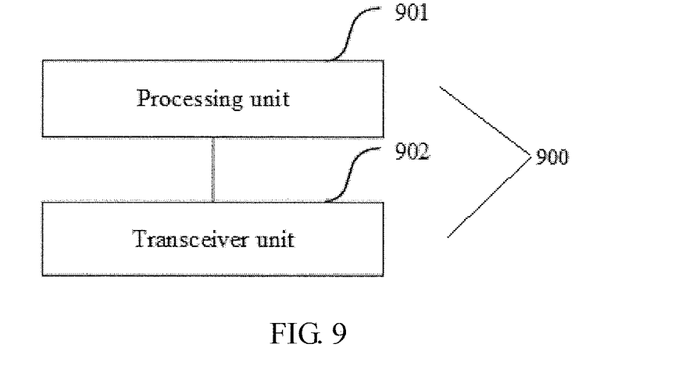
FIG. 9 is a schematic structural diagram of a terminal according to an aspect of this application.

Based on a same concept, FIG. 9 is a schematic structural diagram of a terminal according to an aspect of this application, and the terminal 900 includes a processing unit 901 and a transceiver unit 902.

The processing unit 901 performs the following operations with the transceiver unit 902:

receiving a system message on a first downlink carrier, where the system message includes first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and receiving a synchronization signal on the second downlink carrier, to implement frequency synchronization with the first uplink carrier.

Figure 10:
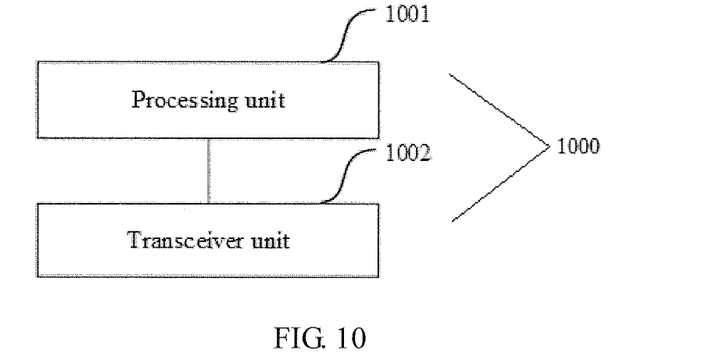
FIG. 10 is a schematic structural diagram of a network device according to an aspect of this application.

Based on a same concept, FIG. 10 is a schematic structural diagram of a network device 100 according to an aspect of to this application, and the network device 1000 includes a processing unit 1001 and a transceiver unit 1002.

The processing unit 1001 performs the following operations with the transceiver unit 1002:

sending a system message on a first downlink carrier, where the system message includes first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and sending a synchronization signal on the second downlink carrier.

Figure 11:
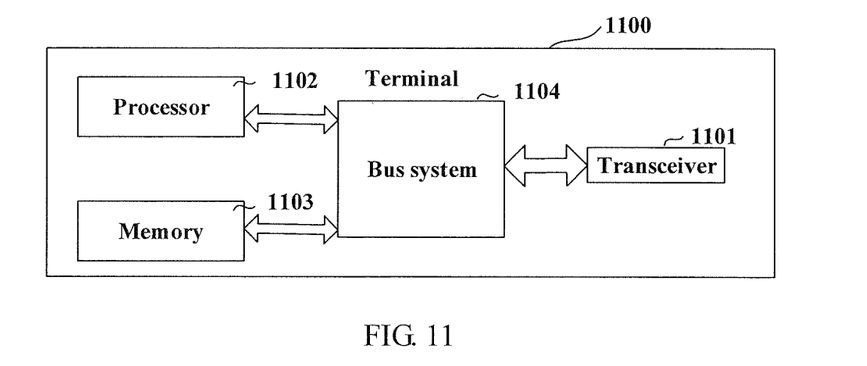
FIG. 11 is a schematic structural diagram of another terminal according to an aspect of this application.

Based on a same concept, FIG. 11 is a schematic structural diagram of another terminal 110 according to an aspect of this application, and the terminal 1100 includes a transceiver 1101, a processor 1102, a memory 1103, and a bus system 1104.

The memory 1103 is configured to store a program. Specifically, the program may include program code, where the program code includes a computer operation instruction. The memory 1103 may be a random access memory (RAM), or may be a non-volatile memory, for example, at least one magnetic disk memory. Only one memory is shown in the figure. Certainly, there may be a plurality of memories as required. The memory 1103 may also be a memory in the processor 1102.

The memory 1103 stores the following elements, executable modules or data structures, or subsets thereof, or extended sets thereof:

operation instructions, including various operation instructions, used to implement various operations; and an operating system, including various system programs, used to implement various basic services and process hardware-based tasks.

The processor 1102 controls an operation of the terminal 1100, and the processor 1102 may also be referred to as a central processing unit (CPU). In specific application, components of the terminal 1100 are coupled together by using the bus system 1104. In addition to a data bus, the bus system 1104 may further include a power bus, a control bus, a status signal bus, and the like. However, for clear description, various types of buses in the figure are marked as the bus system 1104. For ease of presentation, FIG. 11 is merely a schematic drawing.

The methods disclosed in the foregoing embodiments of this application may be applied to the processor 1102, or implemented by the processor 1102. The processor 1102 may be an integrated circuit chip and has a signal processing capability. In an implementation process, steps in the foregoing methods may be implemented by using an integrated logical circuit of hardware in the processor 1102, or by using instructions in a form of software. The processor 1102 may be a general purpose processor, a digital signal processor, an application-specific integrated circuit, a field programmable gate array or another programmable logic device, a discrete gate or a transistor logic device, or a discrete hardware component, and can implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1103. The processor 1102 reads information in the memory 1103, and performs the steps of the foregoing methods in combination with hardware of the processor 1102.

Figure 12:
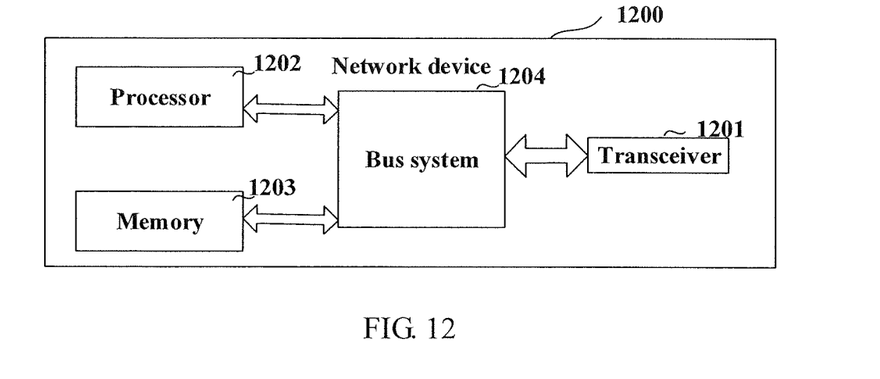
FIG. 12 is a schematic structural diagram of another network device according to this application.

Based on a same concept, FIG. 12 is a schematic structural diagram of another network device 1200 according to an aspect of this application, and the network device 1200 includes a transceiver 1201, a processor 1202, a memory 1203, and a bus system 1204.

The memory 1203 is configured to store a program. Specifically, the program may include program code, where the program code includes a computer operation instruction. The memory 1203 may be a random access memory (RAM), or may be a non-volatile memory, for example, at least one magnetic disk memory. Only one memory is shown in the figure. Certainly, there may be a plurality of memories as required. The memory 1203 may also be a memory in the processor 1202.

The memory 1203 stores the following elements, executable modules or data structures, or subsets thereof, or extended sets thereof:

operation instructions, including various operation instructions, used to implement various operations; and an operating system, including various system programs, used to implement various basic services and process hardware-based tasks.

The processor 1202 controls an operation of the network device 1200, and the processor 1202 may also be referred to as a central processing unit (CPU). In specific application, components of the network device 1200 are coupled together by using the bus system 1204. In addition to a data bus, the bus system 1204 may further include a power bus, a control bus, a status signal bus, and the like. However, for clear description, various types of buses in the figure are marked as the bus system 1204. For ease of presentation, FIG. 12 is merely a schematic drawing.

The methods disclosed in the foregoing embodiments of this application may be applied to the processor 1202, or implemented by the processor 1202. The processor 1202 may be an integrated circuit chip and has a signal processing capability. In an implementation process, steps in the foregoing methods may be implemented by using an integrated logical circuit of hardware in the processor 1202, or by using instructions in a form of software. The processor 1202 may be a general purpose processor, a digital signal processor (DSP), an application-specific integrated circuit (ASIC), a field programmable gate array (FPGA) or another programmable logic device, a discrete gate or a transistor logic device, or a discrete hardware component, and can implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1203. The processor 1202 reads information in the memory 1203, and performs the steps of the foregoing methods in combination with hardware of the processor 1202.

A person skilled in the art should understand that the embodiments of the present application may be provided as a method, a system, or a computer program product. Therefore, the embodiments of the present application may use a form of hardware only embodiments, software only embodiments, or embodiments with a combination of software and hardware. Moreover, the embodiments of the present application may use a form of a computer program product that is implemented on one or more computer-usable storage media (including but not limited to a magnetic disk memory, a CD-ROM, an optical memory, and the like) that include computer-usable program code.

The embodiments of the present application are described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of processes and/or blocks in the flowcharts and/or the block diagrams. These computer program instructions may be provided to a general-purpose computer, a dedicated computer, an embedded processor, or a processor of any other programmable data processing device to generate a machine, so that the instructions executed by a computer or the processor of the any other programmable data processing device generate an apparatus for implementing a specific function in one or more processes in the flowcharts and/or in one or more blocks in the block diagrams.

These computer program instructions may be stored in a computer readable memory that can instruct the computer or the any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of the present application without departing from the spirit and scope of this application. This application is intended to cover these modifications and variations provided that they fall within the scope of protection defined by the following claims and their equivalent technologies.

What is claimed is:

1. A synchronization method, comprising:
   receiving, by a terminal, a system message on a first downlink carrier, wherein the system message comprises first indication information, and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and
   receiving, by the terminal, a synchronization signal on the second downlink carrier, to implement frequency synchronization with the first uplink carrier.

2. The method according to claim 1, wherein that the frequency of the first uplink carrier is presynchronized with the frequency of the second downlink carrier comprises:
   a frequency domain spacing between the first uplink carrier and the second downlink carrier is less than a predefined value.

3. The method according to claim 1, wherein that the frequency of the first uplink carrier is presynchronized with the frequency of the second downlink carrier comprises:
   the second downlink carrier is located in an operating band of a third downlink carrier, and the third downlink carrier is a downlink carrier paired with the first uplink carrier.

4. The method according to claim 3, wherein the second downlink carrier is located in a guard bandwidth of the third downlink carrier.

5. The method according to claim 3, wherein the second downlink carrier is located in a transmission bandwidth of the third downlink carrier.

6. The method according to claim 5, wherein the second downlink carrier is located on an unoccupied frequency domain resource in a non-MBSFN subframe of the third downlink carrier, or is located on an unoccupied frequency domain resource in an MBSFN subframe of the third downlink carrier.

7. A synchronization method, comprising:
   sending, by a network device, a system message on a first downlink carrier, wherein the system message comprises first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and
   sending, by the network device, a synchronization signal on the second downlink carrier.

8. The method according to claim 7, wherein that the frequency of the first uplink carrier is presynchronized with the frequency of the second downlink carrier comprises:
   a frequency domain spacing between the first uplink carrier and the second downlink carrier is less than a predefined value.

9. The method according to claim 7, wherein that a frequency of the first uplink carrier is presynchronized with the frequency of the second downlink carrier comprises:
the second downlink carrier is located in an operating band of a third downlink carrier, and the third downlink carrier is a downlink carrier paired with the first uplink carrier.

10. The method according to claim 7, wherein the second downlink carrier is located in a guard bandwidth of a third downlink carrier or in a transmission bandwidth of the third downlink carrier.

11. An apparatus, comprising a processor and a memory having instructions;
wherein the instruction is performed by the processor to cause the apparatus to:
receive a system message on a first downlink carrier, wherein the system message comprises first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and
receive a synchronization signal on the second downlink carrier, to implement frequency synchronization with the first uplink carrier.

12. The apparatus according to claim 11, wherein that the frequency of the first uplink carrier is presynchronized with the frequency of the second downlink carrier comprises:
a frequency domain spacing between the first uplink carrier and the second downlink carrier is less than a predefined value.

13. The apparatus according to claim 11, wherein that the frequency of the first uplink carrier is presynchronized with the frequency of the second downlink carrier comprises:
the second downlink carrier is located in an operating band of a third downlink carrier, and the third downlink carrier is a downlink carrier paired with the first uplink carrier.

14. The apparatus according to claim 13, wherein the second downlink carrier is located in a guard bandwidth of the third downlink carrier.

15. The apparatus according to claim 13, wherein the second downlink carrier is located in transmission bandwidth of the third downlink carrier.

16. The apparatus according to claim 15, wherein the second downlink carrier is located on an unoccupied frequency domain resource in a non-MBSFN subframe of the third downlink carrier, or is located on an unoccupied frequency domain resource in an MBSFN subframe of the third downlink carrier.

17. An apparatus comprising a processor and a memory having instructions;
wherein the instructions are performed by the processor to cause the apparatus to:
send a system message on a first downlink carrier, wherein the system message comprises first indication information and second indication information, the first indication information indicates a frequency domain range of a first uplink carrier, the second indication information indicates a frequency domain range of a second downlink carrier, and a frequency of the first uplink carrier is presynchronized with a frequency of the second downlink carrier; and
send a synchronization signal on the second downlink carrier.

18. The network device according to claim 17, wherein that the frequency of the first uplink carrier is presynchronized with the frequency of the second downlink carrier comprises:
a frequency domain spacing between the first uplink carrier and the second downlink carrier is less than a predefined value.

19. The network device according to claim 17, wherein that the frequency of the first uplink carrier is presynchronized with the frequency of the second downlink carrier comprises:
the second downlink carrier is located in an operating band of a third downlink carrier, and the third downlink carrier is a downlink carrier paired with the first uplink carrier.

20. The network device according to claim 19, wherein the second downlink carrier is located in a guard bandwidth of a third downlink carrier or in transmission bandwidth of the third downlink carrier.

* * * * *